United States Patent [19]

Dany et al.

[11] 4,105,735
[45] Aug. 8, 1978

[54] PROCESS FOR FLAMEPROOFING PLASTICS

[75] Inventors: Franz-Josef Dany, Erftstadt Lechenich; Karl Maier, Augsburg; Tomas Riedel, Biberbach; Joachim Wortmann, Türnich, all of Fed. Rep. of Germany

[73] Assignee: Hoechst Aktiengesellschaft, Frankfurt am Main, Fed. Rep. of Germany

[21] Appl. No.: 727,461

[22] Filed: Sep. 28, 1976

Related U.S. Application Data

[62] Division of Ser. No. 550,942, Feb. 19, 1975, abandoned.

[30] Foreign Application Priority Data

Feb. 22, 1974 [DE] Fed. Rep. of Germany ....... 2408488

[51] Int. Cl.$^2$ .............................................. C09K 3/28
[52] U.S. Cl. ............................... 264/143; 106/15 FP; 252/8.1; 260/23 S; 260/28 R; 260/28.5 A; 260/37 N; 260/42; 260/DIG. 24

[58] Field of Search ................... 106/15 FP; 252/8.1; 260/28 R, 28.5 A, 37 N, 42, DIG. 24, 23 S; 264/143

[56] References Cited

U.S. PATENT DOCUMENTS

| | | | |
|---|---|---|---|
| 3,488,711 | 1/1970 | Dany et al. ........................... 427/220 |
| 3,663,174 | 5/1972 | Dany et al. ........................... 423/322 |
| 3,951,908 | 4/1976 | Kaiser et al. ..................... 260/45.7 P |

*Primary Examiner*—Lorenzo B. Hayes
*Attorney, Agent, or Firm*—Connolly and Hutz

[57] ABSTRACT

A process for flameproofing plastics comprising incorporating in the plastic a homogeneous granulate containing pulverulent red phosphorus with a particle size of up to about 100 microns and a binder; the granulate is more particularly comprised of a blend of 10–97 % by weight of red phosphorus,
3–50 % by weight of a binder melting between about 30° and 180° C and being selected from waxes and/or waxy substances and/or metal soaps, and up to 87 % by weight of addends promoting the flameproofing efficiency of the granulate, inhibiting the evolution of gaseous phosphines upon the incorporation of the granulate with the plastics, or being suitable fillers.

3 Claims, No Drawings

PROCESS FOR FLAMEPROOFING PLASTICS

This application is a division of application Ser. No. 550,942 filed Feb. 19, 1975, now abandoned.

It is known in the art that pulverulent red phosphorus can be used for flameproofing plastics, generally by incorporating it therewith by methods conformed to the particular type of plastics material concerned, and granulating the plastics material having the phosphorus incorporated therein.

German published Specification "Offenlegungsschrift" No. 1,931,387, for example, describes a self-extinguishing moulding composition which is based on polyamides, reinforced by means of glass fibers and contains between 0.5 and 15% of red phosphorus as a flameproofing agent. The moulding composition is more particularly produced by blending glass fiber-reinforced polyamide-6-granules with variable quantities of red phosphorus in a drum mixer, plasticizing the blend at temperatures within the range 270° and 280° C in an extruder, making the extruded material into strands, and reducing the strands to cylindrical granular material.

A process similar to that just described has been disclosed in German published Specification "Offenlegungsschrift" 1,694,530, wherein non-glowing polyvinyl chloride containing phosphorus is produced by blending pulverulent suspension-polymerized polyvinyl chloride with pulverized red phosphorus, extruding the blend and making it into moulded material.

These earlier processes are not satisfactory, however, in view of the fact that the treatment of pulverulent red phosphorus is normally accompanied by the formation of dust, which may be injurious to the health of the operating personnel and which is likely to undergo self-ignition. The very same undesirable phenomenon occurs in the process for making flame-retardant polyesters described in German published specification "Offenlegungsschrift" No. 2,126,923, wherein the polyesters are made while admixing the polyester batch with pulverulent red phosphorus. More especially, a suspension of red phosphorus in ethylene glycol is prepared under nitrogen as a protective gas and the suspension is polycondensed with dimethyl terephthalate.

A still further process for making thermoplastic material rendered flame-retardant by means of red phosphorus has been described in German published specification "Auslegeschrift" No. 1,965,635, wherein red phosphorus impregnated with a lactam having from 4 to 12 carbon atoms is incorporated with the plastic material, prior to, during, or after fusion thereof. The lactamimpregnated phosphorus is more particularly comprised of a blend of 25-90 weight % of fine particulate red phosphorus and 10-75 weight % of lactam. Prior to, or after, the incorporation of the blend into the thermoplastic material, the lactam may substantially or partially be recovered therefrom by distillation.

In this latter process, it is necessary for the processing machinery to be provided with gas vents permitting the lactam to be expelled from the plastic material, which is technically difficult to achieve, or to be recovered therefrom.

It is accordingly highly desirable to have red phosphorus which is not likely to dust and accordingly free from the disadvantageous effects reported above, on being incorporated as a flameproofing agent into plastic material.

To this end, the invention provides for the use of a granulate consisting substantially of red phosphorus and a suitable binder, the granulate being incorporated with the plastic material without the need to remove the binder therefrom, irrespective of the particular type of plastic material concerned.

The invention provides more particularly a homogeneous granulate containing pulverulent red phosphorus with a particle size of up to about 100 microns and a binder for the flameproofing of plastics, the granulate being comprised of:

10-97 weight % of red phosphorus,
3-50 weight % of a binder melting between about 30° and 180° C and being selected from waxes and/or waxy substances and/or metal soaps, and up to
87 weight % of addends promoting the flameproofing efficiency of the granulate, inhibiting the evolution of gaseous phosphines upon the incorporation of the granulate with the plastic material, or being suitable fillers.

In accordance with a preferred feature of this invention, the granulate contains between 30 and 92 weight % of red phosphorus and between 8 and 15 weight % of a binder melting at temperatures within the range 50° and 150° C. The useful binders should be selected, for example, from ester waxes having from 12 to 32 carbon atoms, from amide waxes having from 12 to 22 carbon atoms, from hydrocarbon waxes having from 30 to 800 carbon atoms, preferably from 150 to 300 carbon atoms, or from fatty acids, fatty alcohols or fatty acid esters having from 12 to 22 carbon atoms, or from metal soaps.

The useful ester waxes include more particularly naturally occurring waxes, such as carnauba wax, candelilla wax or crude montana wax as well as esterification products of long chain natural or synthetic carboxylic acids with mono- or polyhydric alcohols, for example stearyl alcohol, ethane diol, butane diol or glycerol. It has been found particularly advantageous to use the esterification products of a wax acid mixture — this being obtained by subjecting crude montana wax to chromic acid oxidation — with ethylene glycol or butylene glycol, the ethylene glycol ester having, for example, a dropping point of 79° C, an acid number of 18 and a saponification number of 142.

The useful amide waxes include, for example, mono- or diamides of natural or synthetic fatty acids, e.g. stearic acid amide, oleic acid amide or bis-stearoylethylene diamine.

The useful hydrocarbon waxes include, for example, petroleum paraffins, microcrystalline waxes, synthetic paraffins, and polyethylene waxes. One of the preferred hydrocarbon waxes is a polyethylene wax having a molecular weight of about 2000, a dropping point of 107° C and a density of 0.92.

The fatty acids or their derivatives, which should conveniently be used, include, for example, natural or synthetic, saturated or unsaturated fatty acids, fatty alcohols or fatty acid esters with mono- or polyhydric alcohols. The use of a glycerol/fatty acid partial ester has been found particularly advantageous.

It is finally possible for the granulate to contain as the binder a metal soap, e.g. calcium stearate or calcium montanate.

The substances termed granulate addends hereinabove enable the properties of the granulate to be beneficially influenced in specific manner. For example, it is possible for the flameproofing effect of the granulate to be improved by the addition of dibromoneopentyl glycol or organic nitrogen compounds, which are carbonized on being burnt and which include, e.g. melamine and polyacrylonitrile.

It is known in the art that minor quantities of gaseous phosphines are set free on subjecting plastics having red phosphorus therein to hot processing treatment, in an extruder. To avoid this, the granulate of the present invention should be used in further admixture with certain proportions of metal oxides, such as MgO, Al$_2$O$_3$, CuO or PbO, or amidosulfonic acid or ammonium bisulfate.

The fillers, which should conveniently be used in the granulate of the present invention, include chalk, kaolin, talc and quartz powder.

The invention also provides a process for making the granulate, which comprises intimately blending and homogenizing the individual granulate components under inert gas, e.g. nitrogen or CO$_2$, granulating the resulting blend in a granulate-forming machine under pressure and at elevated temperature, and cooling the granulate obtained.

The following statements further illustrate the preparation of the graulate.

The binder and addends, if any, should preferably be distributed in red phosphorus in a rapid mixer such as those commonly used in the plastics industry. Less rapidly rotating mixers can also be used provided that the blend is homogeneous at the end of the mixing operation.

In those cases in which the binder is a high-melting wax, it is convenient for the granulate components to be blended together at elevated temperature so as to homogenize the blend more rapidly.

Red phosphorus containing a relatively small proportion of binder should conveniently be granulated in machines, wherein the pulverulent blend is compressed under high pressure, and compacted. Under the influence of pressure and frictional heat, the binders are rendered soft, or they fuse. After solidification of the binder, abrasionproof particles are obtained, which are easy to distribute in a melt of plastic material. In those cases in which a higher-melting or hard binder is used, it is advantageous for the blend and/or the compacting machine to be pre-heated.

Abrasionproof particulate granulate is more particularly obtained with use of a gear-tooth granulate-forming machine, in which the individual teeth are arranged to mesh with each other, and the tooth base is provided with bores, or with the use of compacting machines which are comprised of two smooth or recessed rollers rotating in opposite directions.

The use of granulated red phosphorus for the flameproofing of plastics has technically beneficial effects as granulated red phosphorus is easy and reliably to use without any need to remove the binder later from the plastics having the flameproofing granulate incorporated therein. The binders used in accordance with this invention have been found to be compatible with the plastics leaving their properties unaffected. The granulate of the present invention can be used, for example, for the flameproofing of polycaprolactam, polyethylene, polypropylene, polystyrene or polyolefin terephthalates, the granulate being preferably used in proportions within the range 5 and 40 weight %, based on the plastics.

The following Examples illustrate the invention. The granulates were made with the use of a gear tooth granulate-forming machine. The bores provided in the tooth base of the machine had a circular cross-sectional area 2-4 mm in diameter. The granulating head of the machine was kept under carbon dioxide.

EXAMPLE 1

90.0 Parts by weight of red phosphorus, 2 parts by weight of copper(II)oxide and 8.0 parts by weight of a pulverulent ester wax having a dropping point of 79° C, an acid number of 18 and a saponification number of 142, were intimately blended in a rapid mixer, under nitrogen. The frictional heat made the temperature of the blend increase to 75° C. The ester wax was prepared by subjecting a wax acid mixture, which was obtained by chromic acid oxidation of crude montana wax, to esterification with ethylene glycol.

The blend made in the rapid mixer was delivered to the granulate-forming machine, of which the teeth were heated to about 70° C, and made therein into cylindrical, abrasionproof granules 2 mm in diameter and about 6 mm long.

EXAMPLE 2

44.0 Parts by weight of red phosphorus, 42.0 parts by weight of melamine, 2.0 parts by weight of amidosulfonic acid and 12.0 parts by weight of a pulverulent polyethylene wax having a molecular weight of about 2000, a dropping point of 107° C and a density of 0.92, were intimately blended in a rapid mixer, under nitrogen. The temperature of the blend increased to about 100° C. The blend was delivered to the granulate-forming machine, of which the teeth were heated to about 70° C, and compressed therein into cylindrical, abrasionproof granules 2 mm in diameter and about 6 mm long.

EXAMPLE 3

45.0 Parts by weight of red phosphorus, 43.0 parts by weight of dibromoneopentyl glycol, 2.0 parts by weight of ammonium bisulfate and 10.0 parts by weight of a pulverulent glycerol-fatty acid partial ester having a dropping point of 58° C, an acid number of 3 and a saponification number of 180, were intimately blended in a rapid mixer, under nitrogen. The temperature of the blend did not exceed 30° C.

The blend was delivered to the granulate-forming machine, of which the teeth remained unheated, and compressed therein into cylindrical, abrasionproof granules 2 mm wide and about 6 mm long.

EXAMPLE 4

The flameproofing efficiency of the granules prepared in the manner described in Example 1 was tested, on polycaprolactam. To this end, 93 parts by weight of polycaprolactam granules and 7 parts by weight of flameproofing granules were intimately blended in an eccentric tumbling mixer, under carbon dioxide, then plasticized in a double screw extruder at 270°–280° C and made into strands. The strands were cooled by passing them through a water bath, then granulated and the granules were dried at 110° C.

The granules were compressed into sheets 6.4 mm thick which were sawn to specimens conform to burn-up test standards. The burn-up tests were made under the standard conditions of "Underwriters' Laboratories" (U.L. 94) and of German Industrial Standard DIN 53438.

According to U.L. 94, the granulate has self-extinguishing properties (Classification SE O). According to DIN 53 438, the granulate specimen 6.4 mm thick is classified as being K 1 material.

EXAMPLE 5

(a) 90 Parts by weight of low pressure polyethylene granulate having a melting index $i_5$ (German Industrial Standard DIN 53 735) of about 20 was blended in a tumbling mixer with 10 parts by weight of the flameproofing granulate of Example 1, the blend was plasticized in a double screw extruder, made into strands and the strands were granulated.

The granulate was compressed at 170° C into sheets 6.4 mm thick which were subjected to burn-up tests. The following results were obtained:

Classification (UL 94): SE O
Classification (DIN 53 438): K 1/6.4 mm (b) The flameproofing granulate of Example 1 was replaced by 10 parts by weight of the flameproofing granulate of Example 2 and the latter was blended with 90 parts by weight of low pressure polyethylene. The following results were obtained in the burn-up test:

Classification (UL 94): SE O
Classification (DIN 53 438): K 1/6.4 mm

EXAMPLE 6

85 Parts by weight of impact-resistant polystyrene granules having a melting index $i_5$ (German Industrial Standard 53 735) of about 4 were blended in a tumbling mixer, under carbon dioxide, with 15 parts by weight of the flameproofing granulate of Example 3, then plasticized in a double screw extruder at 180° C, compressed and granulated. The granulate was made at 170° C into sheets 6.4 mm thick. The following results were obtained in the burn-up test:

Classification (UL 94): SE O
Classification (DIN 53 438): K 1/6.4 mm

The power needed for the extrusion of the granulate blends of Examples 1 to 6 was only slightly higher than that needed for the extrusion of the pure plastics granulate.

The phosphine concentration identified near the extruder outlet delivering the plastic strand was always lower than the MAK-limit of 0.1 ppm (MAK stands for the allowable maximum concentration, i.e. for the maximum phosphine concentration found allowable for the operating personnel).

We claim:
1. Process for the flameproofing of a plastic selected from the group consisting of polycaprolactam, polyethylene and polystyrene with a flameproofing agent, which process comprises mixing pulverulent plastic with 5-40% by weight thereof of the flameproofing agent, plasticising and extruding the mixture at elevated temperature and granulating the extruded material, a flameproofing agent being a homogeneous granulate of

10-97% by weight of red phosphorus with a particle size of up to about 100 microns,
3-50% by weight of a binder selected from the group consisting of
  (a) the esterification product of ethylene glycol with a wax acid mixture obtained by subjecting crude montana wax to chromic acid oxidation,
  (b) a polyethylene wax having a molecular weight of about 2000 and
  (c) the glycerol-fatty acid partial ester having a dropping point of 58° C, an acid number of 3 and a saponification number of 180, and
up to 87% by weight of an addend which is melamine, polyacrylonitrile amidosulfonic acid, ammonium bisulfate, copper(II)oxide, $Al_2O_3$, PbO,MgO, dibromoneopentyl glycol, or a mixture thereof.

2. The process of claim 1 wherein the weight % of red phosphorus and said binder in the flameproofing agent is 30-92 and 8-15 respectively.

3. The process of claim 1 wherein the esterification product of the wax acid mixture with ethylene glycol has a dropping point of 79° C, an acid number of 18 and a saponification number of 142.

* * * * *